United States Patent
Hsu

Patent Number: 6,084,325
Date of Patent: Jul. 4, 2000

[54] BRAKE DEVICE WITH A COMBINATION OF POWER-GENERATING AND EDDY-CURRENT MAGNETIC RESISTANCE

[76] Inventor: Cheng-Chien Hsu, 9th - 1 Fl., 117, Sung Te Road, Taipei City, Taiwan

[21] Appl. No.: 09/237,928

[22] Filed: Jan. 27, 1999

[51] Int. Cl.$^7$ .................................................. A63B 21/00
[52] U.S. Cl. ........................... 310/74; 310/93; 318/161; 318/375; 188/161; 242/288; 482/2; 482/63
[58] Field of Search .................. 310/74, 77, 93; 318/375, 376, 377, 378, 379, 380, 381, 150, 161; 188/158, 159, 160, 161, 162, 164; 242/288; 482/2, 63, 64

[56] References Cited

U.S. PATENT DOCUMENTS

| | | | |
|---|---|---|---|
| 4,612,494 | 9/1986 | Kawamura | 310/74 |
| 4,775,145 | 10/1988 | Tsuyama | 272/73 |
| 5,072,930 | 12/1991 | Sun | 272/73 |
| 5,234,083 | 8/1993 | Lee | 188/267 |
| 5,236,069 | 8/1993 | Peng | 188/267 |
| 5,254,061 | 10/1993 | Leask | 482/63 |
| 5,586,624 | 12/1996 | Ko et al. | 188/164 |
| 5,659,231 | 8/1997 | Svarovsky et al. | 318/368 |
| 5,711,404 | 1/1998 | Lee | 188/164 |
| 5,879,273 | 3/1999 | Wei et al. | 482/63 |

*Primary Examiner*—Nicholas Ponomarenko
*Assistant Examiner*—B. Mullins
*Attorney, Agent, or Firm*—Rosenberg, Klein & Lee

[57] ABSTRACT

The present invention relates to a brake device with a combination of power-generating and eddy-current magnetic resistance having an outer ]-shaped fly wheel fastened on a central axle of a frame and fitted with a permanent magnet on the inner circular edge to form a rotor type, and the fly wheel is connected with a stator core fastened on the frame; moreover, one end of the central axle is stretching out of the frame and fitted with a belt wheel; the front end of the frame is fitted with a brake core adjacent to the outer edge of the fly wheel to supply a planned eddy current magnetic resistance to the fly wheel; in accordance with such design, the device generates power by means of the exercise force of users to drive the fly wheel to rotate, after passing through a DC power supply, it provides display & controlling gage with power source so that the power-generating and the eddy current magnetic resistance are integrated to reach the effect of reducing the volume and the producing cost.

9 Claims, 7 Drawing Sheets

BRAKE DEVICE WITH A COMBINATION OF POWER-GENERATING AND EDDY-CURRENT MAGNETIC RESISTANCE

BACKGROUND OF THE INVENTION

1. Field of the Invention

The present invention relates to a brake device mounted on the gymnastic equipment to control the motion loading of, and more particularly to a two-in-one magnetic control device which makes use of the externally rotary fly wheel to generate power and to control the loading condition.

2. Description of the Prior Art

The brake (loading) device for conventional indoor exercise equipment makes use of no other than friction type, oil pressure type, fan type, etc. The friction type brake device has inconvenience of oil leakage, noise-making and reduction of braking effect at a high temperature while the fan type has drawbacks with huge volume, poor appearance, narrow loading range and difficult adjustment.

Accordingly, the eddy current type resistance formed by the change of the magnetic field is made used recently. Since it belongs a non-contact form of magnetic control, it was highly appreciated on the market. Such device was disclosed in the application (No. 79206996) in Taiwan R.O.C. which is called "permanent magnet type adjustable brake device" (U.S. Pat. No. 5,096,024); one amendment thereto was applied as No. 79206996 and U.S. Pat. No. 5,437,353. In addition, it was also disclosed in the R.O.C. Patent No. 80211672 "Eddy combined magnetic field resistance brake device" (U.S. Pat. No. 5,234,083), R.O.C. Patent No. 82218230 "Magnetic loading system of magnetic control for gymnastic car", R.O.C. Patent No. 82215087 "Loading adjustment device with magnetic control for gymnastic car", R.O.C. Patent No. 85207333 "Magnetic control braking device with lateral movement type for gymnastic car", R.O.C. Patent No. 86213735 "Magnetic control wheel for gymnastic car", and the following U.S. Pat. Nos.:

1. 5,072,930;
2. 5,236,069;
3. 5,586,624; and
4. 4,775,145.

In the above-mentioned applications of magnetic control device with eddy current type, their basic principle is that conductor is placed in the variable magnetic flux so that a reverse electromotive force is generated on the locally closed circuit inside of the conductor so that the so-called eddy current is produced. The flow direction of this eddy current building the magnetic effect must be contrary to the variable direction of the original magnetic flux creating this current. Moreover, the Max-well's Equation tells that this magnetic force is proportional to the square of the density of the magnetic flux. It is just required by the brake (loading) of the gymnastic equipment.

Although the magnetic control device with eddy current type has its advantages and features, it is difficult for the loading part, when the permanent magnet is used to be the magnetic field source, to be connected to the external digital signal to reach the goal of computerization and digitalization, unless a motor and a motor controller are extra installed to change the relative position of the magnet and the conductor, or electromagnetic coil and extra added power are used to overcome this difficulty which bring much inconvenience in usage and the practicalness is therefore reduced, so that it can only be applied to the gymnastic equipment with lower price. Nevertheless, the accuracy and the real effect are taken more and more seriously to the gymnastic equipment, and it can only be reached by means of the computerization and digitalization. In addition, the gymnastic equipment with digitalized functions should be equipped with gauges and controllers which also require power. When the power is supplied from outside, it brings a lot of troubles and restrictions.

Accordingly, the inventor has developed a permanent magnetic three-phase AC brake device by the way of generator to be the loading for the gymnastic and rehabilitative equipment. A conventional permanent magnetic three-phase AC generator makes use of the magnetic field created by the current value on the stator coil which is a "reverse filed" resulting in a reverse torque to form a "loading", so that the current value of the stator coil must be very great, otherwise an appropriate resistance is not able to be produced. Thus, it results in disadvantages of a huge volume and an expensive production price. Furthermore, the permanent magnetic AC generator has resonance point, so that the loading control is very unstable. Consequently, it is not a completely practical brake device.

Besides, the outer edge of a circular copper strip is coaxially cut into a central gap an electromagnet to form the braking resistance. However, the copper strip is thin and large, and the flatness processing and installation are very difficult, so that the gap between the copper strip and the electromagnet is not able to be fix when the copper strip rotates. Therefore, the loading is very unstable, the whole structure is complex and it is not proper to be installed in the gymnastic equipment.

SUMMARY OF THE INVENTION

It is a main object of the present invention to provide a brake device with a combination of power-generating and eddy-current magnetic resistance whose whole structure is complete, whose volume is small and which is suitable for all kinds of gymnastic equipment.

It is another object of the present invention to provide a brake device to have both power-generating effect and loading control effect, and the power can be supplied to parts concerned without an external connection to the power supply in order to reach the goal of convenient use.

It is a further object of the present invention to provide a brake device with stable loading and with high accuracy to control the motion speed.

In order to reach the above objects, the present invention includes a fly wheel having an outwardly flanged peripheral, rim, portion fastened on a central axle of a frame and fitted with a permanent magnet on the inner circular edge to form a rotor type, and the fly wheel is connected with a stator core fastened on the frame; moreover, one end of the central axle is stretching out of the frame and fitted with a belt wheel; the front end of the frame is fitted with a brake core adjacent to the outer edge of the fly wheel to supply a planned eddy current magnetic resistance to the fly wheel; in accordance with such design, the device generates power by means of the exercise force of users to drive the fly wheel to rotate, after passing through a DC power supply, it provides display & controlling gage with power source so that the power-generating and the eddy current magnetic resistance are integrated to reach the effect of reducing the volume and the producing cost.

BRIEF DESCRIPTION OF THE DRAWINGS

The drawings disclose illustrative an embodiment of the present invention which serves to exemplify the various advantages and objects hereof, and are as follows.

DETAILED DESCRIPTION OF THE PREFERRED EMBODIMENT

Figure 1:
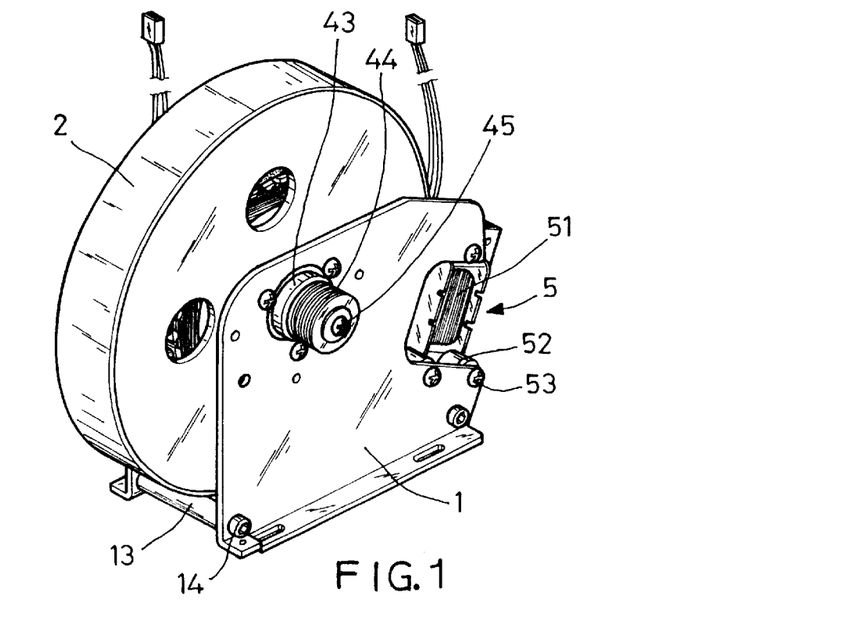
FIG. 1 is a perspective view of a preferred embodiment of the present invention.
Figure 2:
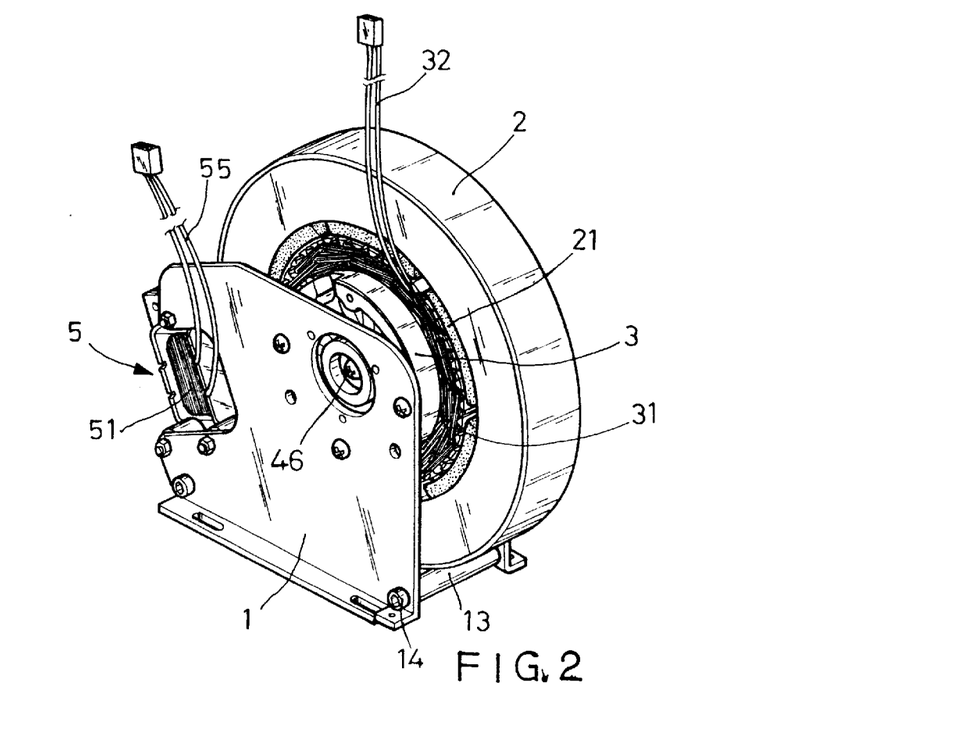
FIG. 2 is another perspective view of the preferred embodiment of the present invention from the other side.
Figure 3:
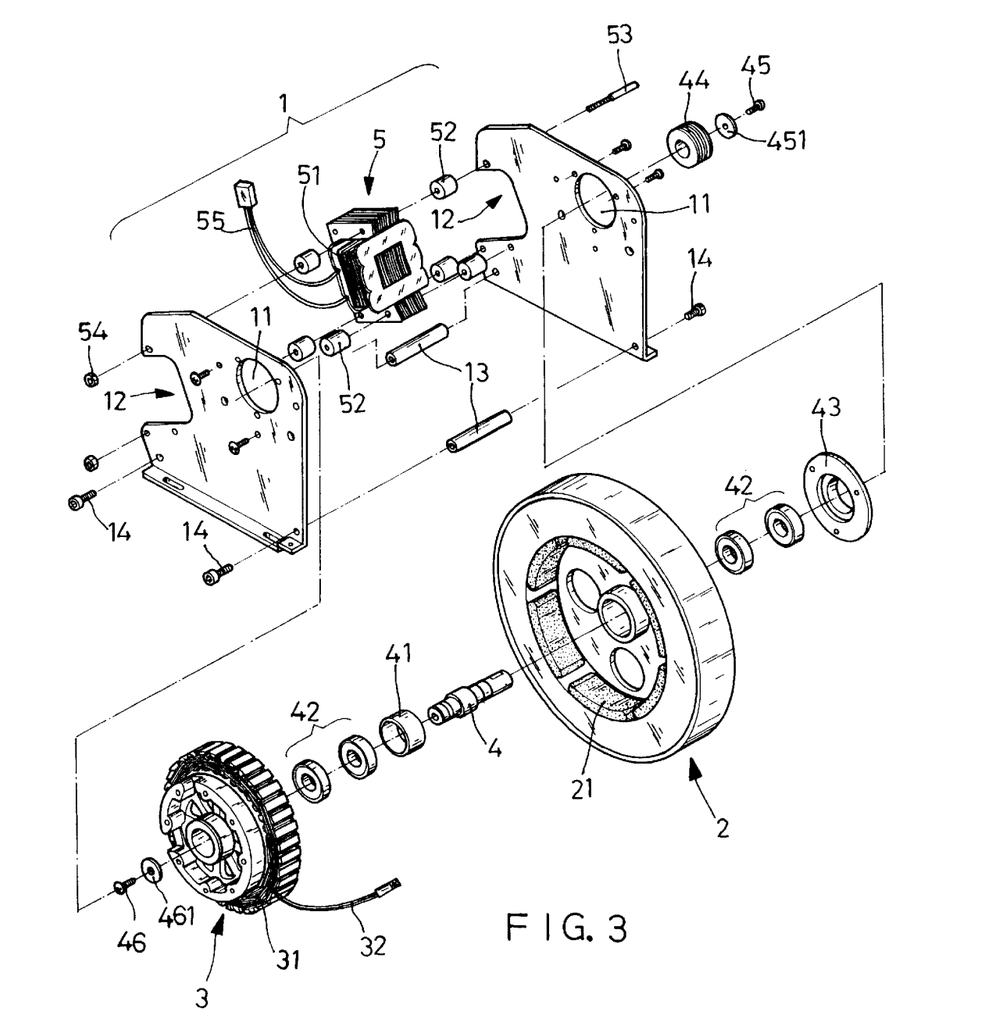
FIG. 3 is a perspective exploded view of the preferred embodiment of the present invention.

First of all, referring to FIGS. 1 through 3, a preferred embodiment of the brake device with a combination of power-generating and eddy-current magnetic resistance in accordance with the present invention includes:

a frame 1 consisting of two symmetric plates on which a borehole 11 is fitted and which has an indentation 12 on the front edge thereof respectively;

a fly wheel 2 with a body having a flanged peripheral portion which is fitted with a permanent magnet 21 on the inner circular edge to form a rotor type, and the fly wheel 2 is connected with a stator core 3 fastened on the frame 1, and the fly wheel 2 is also fastened between two plates of the frame 1 by means of a central axle 4 to pass through the required ring 41 and a number of bearings 42 and one end of the central axle 4 passes through a bearing collar 43 mounted on the borehole 11 of the corresponding plate, and a belt wheel 44 is fitted for the purpose of drive use;

a brake core 5 comprised of E-shaped silicon steel plates overlapped together around which a coil 51 circles, and the two sides of the brake core 5 are fastened by plugs 52, bolts 53 and nuts 54 on the indentations 12 of the frame 1, and the brake core 5 is placed adjacent to the outer circular edge to receive a planned eddy current magnetic resistance for the fly wheel 2.

Furthermore, the outer side of the belt wheel 44 is fastened by a washer 451 and a bolt, and the other side of the central axle 4 corresponding to the belt wheel is fixed by a washer 461 and bolts 46.

Figure 4:
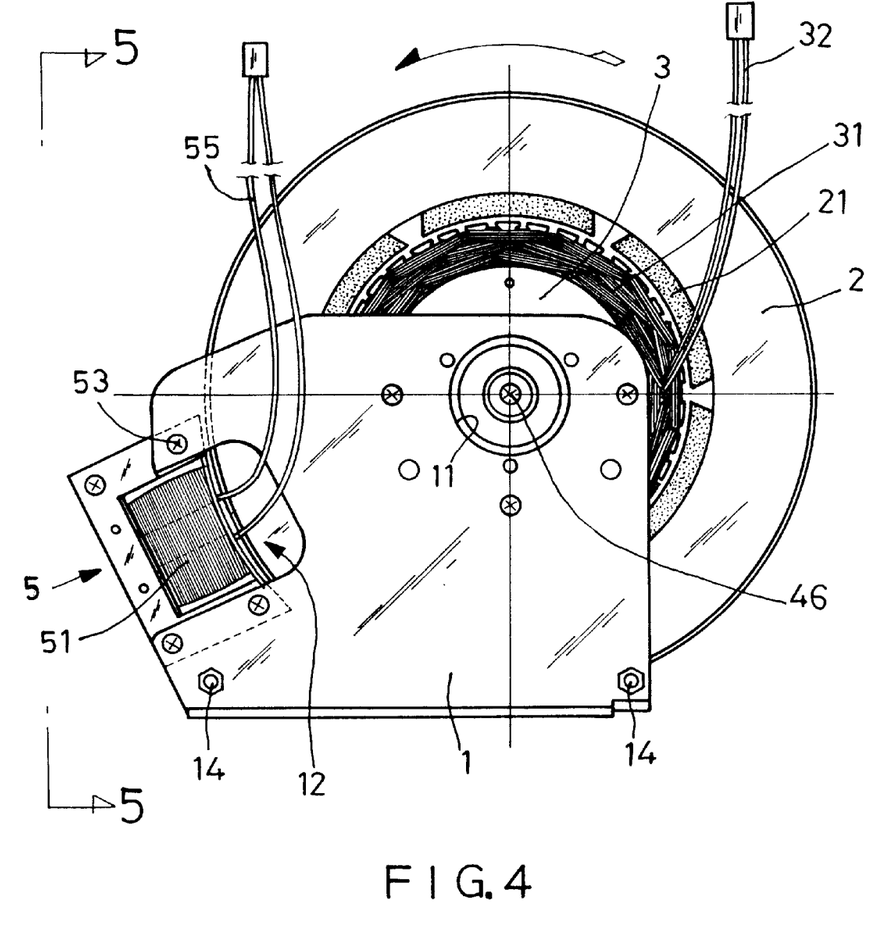
FIG. 4 is a side elevation view of the preferred embodiment of the present invention.
Figure 5:
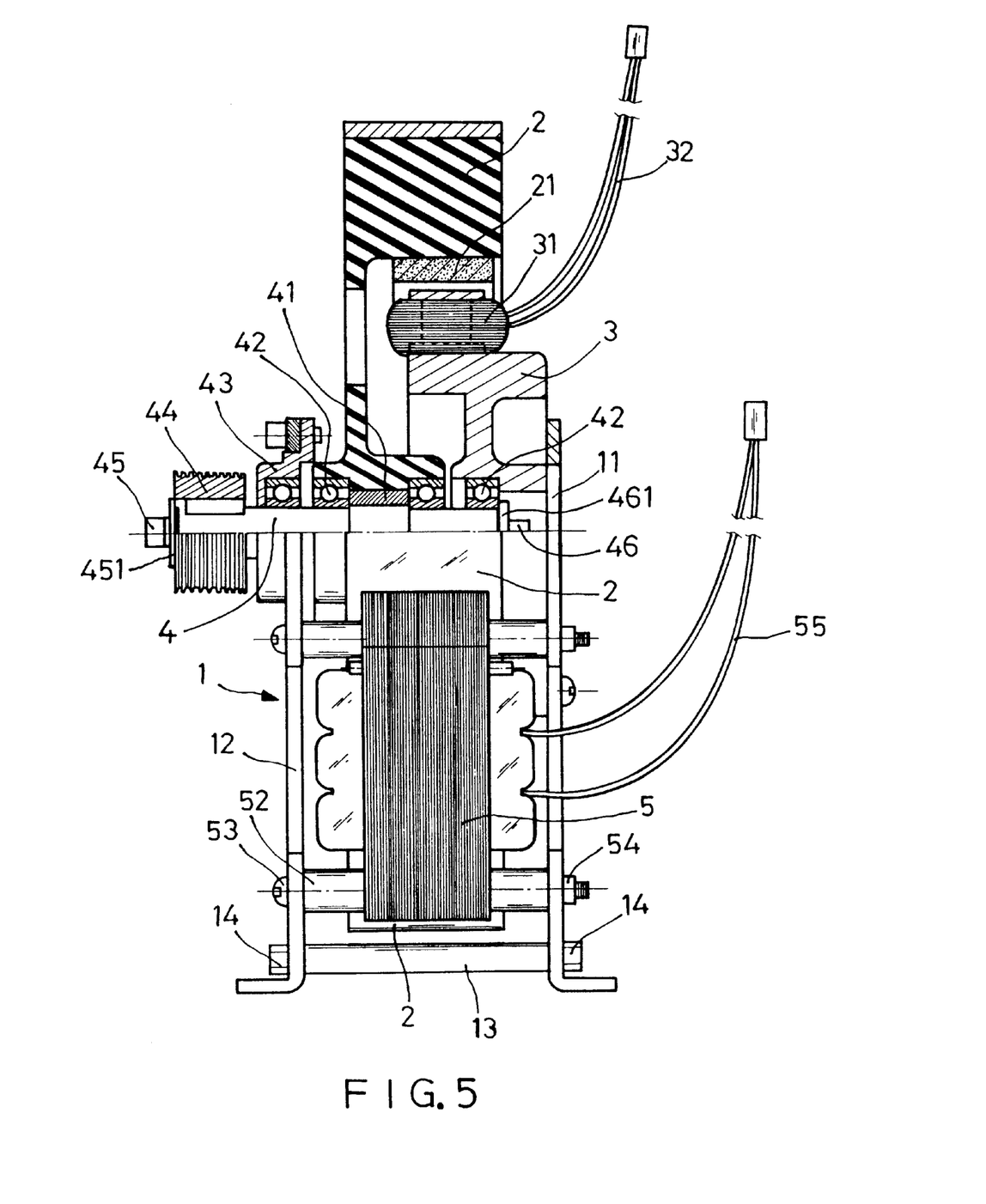
FIG. 5 is a half sectional view in accordance with FIG. 4 along the line 5—5.
Figure 6:
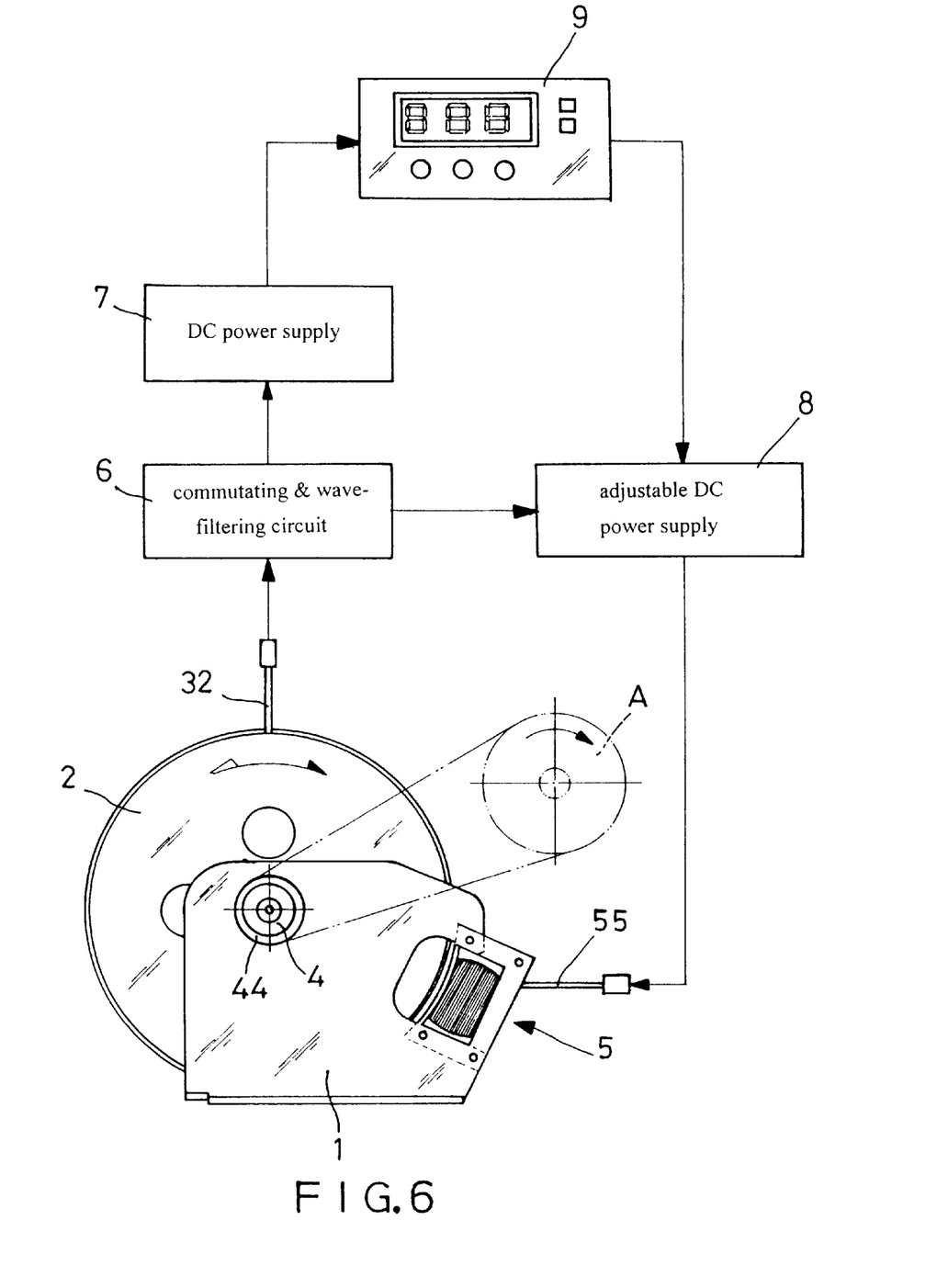
FIG. 6 is an installation drawing for the overall control of the present invention.

Afterwards, referring to FIGS. 4 and 5, the structure of the present invention is complete and small after assembly, and the stator core 3 and the brake core are respectively connected to the cables 32 and 55 so that it is easy to be mounted on the gymnastic or rehabilitative equipment. At the same time, referring to FIG. 6, when the wheel of the gymnastic equipment (not shown) rotates, the fly wheel 2 on the frame 1 is driven to rotate by means of the belt wheel 14, and the permanent magnet 21 at the inner edge of the fly wheel 2 and the stator core 3 form a magnetic circuit to make the coil 31 to generate voltage. This is the principle for the permanent magnet type AC generator. The present invention makes use of this principle to take the fly wheel 2 as the power source to generate the alternating current while it is also used to control the loading at the same time. Consequently, when the fly wheel 2 rotates, not only the stator core 3 is able to produce the voltage, but also the magnetic field caused by the current value on the coil 31 of the stator core 3 is a reverse magnetic field corresponding to the fly wheel 2 so that a reverse torque (reverse electromotive force) is formed. Accordingly, the stator core 3 itself is also a loading for the fly wheel 2; however, this reverse torque is not great. In order to produce a braking resistance to the fly wheel 2, the electromotive force must be immense. To reach it, the producing cost and the volume will be therefore increased. In the prior art, it is not a practical design to make use of the reverse field of the stator core 3 to control the loading. It is not considered to have an application value for the industry after applied in the market. Therefore, the present invention is developed to improve the prior art. The voltage produced by the stator core 3 passes through a commutating & wave-filtering circuit 6 in order to obtain a stable circuit, and then passes through a DC power supply 7 and an adjustable DC power supply 8. The DC power supply 7 supplies the DC power required by the display & control gauge 9 on the gymnastic equipment so that the whole gymnastic equipment is able to be computerized without connecting to the external power source. The adjustable DC power supply 8 converts the AC voltage produced by the permanent magnetic type AC generator to the DC voltage to supply the current required by brake core 5 on the side of the fly wheel 2. So, the current produced by the brake core 5 and the magnetic field produced by the stator core 3 is different since a real eddy current formed by the brake core will cause a magnetic resistance effect on the fly wheel 2. After testing, only this "eddy magnetic resistance" is able to provide an enough braking resistance without a resonance point. Moreover, the magnetic resistance value of the brake core 5 is able to be directly adjusted by the digital signal of the display & control gauge 9, so that the motion speed can be controlled, the loading can be stabilized and the accuracy can be increased.

In accordance with the above-mentioned technique and means, the power generating and the eddy current magnetic resistance are ingeniously integrated in the present invention. When the fly wheel 2 is driven to rotate, the power-generating effect is produced at once, and the inner stator core 3 exerts an effect of slighter reverse field resistance on the inner circle of the fly wheel 2. By means of the alternating current produced which passes through the adjustable DC power supply 8 to provide the DC power required by the brake core 5, a greater "eddy current magnetic resistance" is formed. Accordingly, in the application of the present invention, a small part of the braking resistance can be formed by the stator core 3 and effected on the fly wheel 2 while the most part of the braking resistance is provided by the brake core 5. The greatest characteristic of the brake device with a combination of power-generating and eddy-current magnetic resistance—such two-in-one brake device—lies in that the stator core 3 is only loaded with a very slight braking resistance, so that the power is little consumed and the volume and the producing cost are therefore able to be reduced. To make use of the brake core 5 to produce most of the braking resistance, it can not only reduce the volume and the producing cost of the generator, but also the power produced by itself can supply the brake core 5 to perform an effective motion loading.

Figure 7:
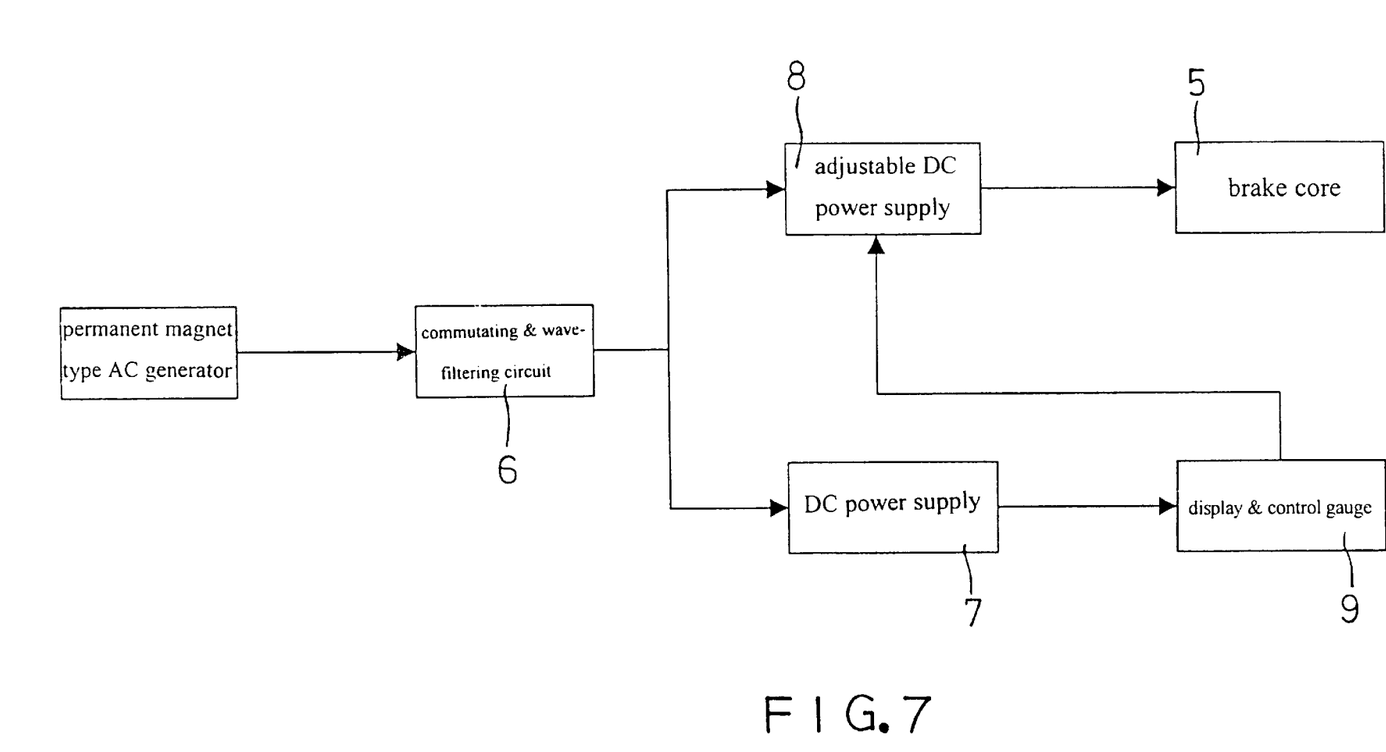
FIG. 7 is a block diagram for the overall control of the present invention.
Figure 8:
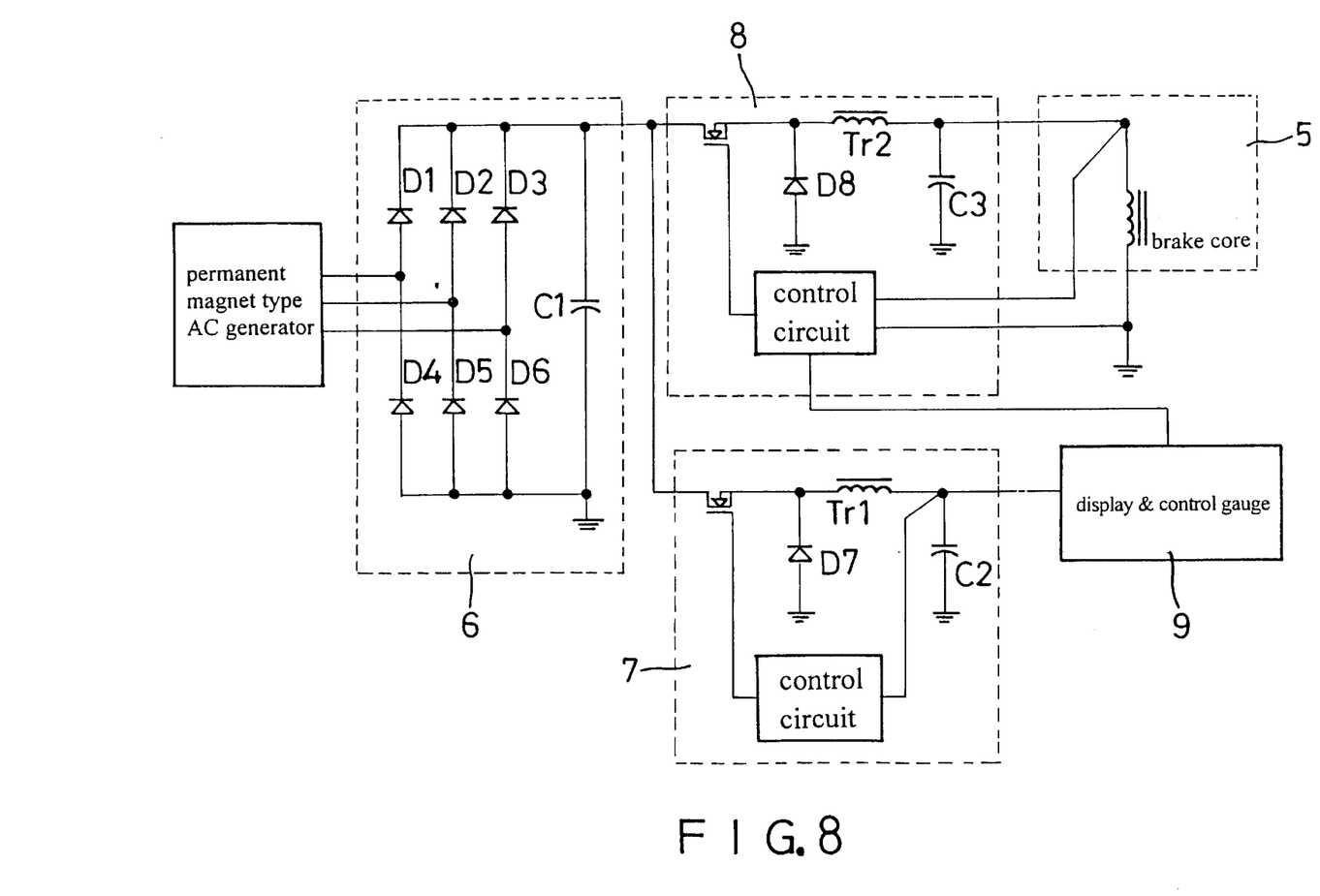
FIG. 8 is a circuit diagram for the overall control of the present invention.

FIG. 7 illustrates a block diagram of the above-mentioned embodiment of the present invention while FIG. 8 shows a circuit diagram of the preferred embodiment. Through this controlling circuit, the above-mentioned two-in-one brake device can reach its effect. After a practical test, it really has the application value to the industry.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An electromagnetic induction braking system comprising:
   (a) a frame including a pair of support plates disposed in spaced manner one from the other, each said support plate having a front edge portion defining an indentation, each said support plate having formed therein a borehole;

(b) a fly wheel rotatably supported between said support plates of said frame, said fly wheel having a central opening and a flanged peripheral portion radially offset therefrom, said fly wheel including at least one permanent magnet secured to said peripheral portion;

(c) a stator core coupled to said frame, said stator core having a plurality of electrically conductive windings, said stator core being electromagnetically coupled to said fly wheel for generation of an induced electric signal responsive to the rotation thereof;

(d) a brake core securely received in said indentations of said frame support plates and disposed adjacent said peripheral portion of said fly wheel for electromagnetic coupling therewith, said brake core including a plurality of electrically conductive windings formed about a plurality of plates of predetermined shape and material composition; and, (e) a feedback assembly coupled to said stator and brake cores, said feedback assembly including at least one power supply for electrically energizing said brake core responsive to said induced electric signal generated by said stator core;

whereby said brake core is adapted to electromagnetically impart to said fly wheel a braking force for opposing the rotation thereof.

2. The electromagnetic induction braking system as recited in claim 1 wherein said power supply of said feedback assembly is an adjustable DC power supply.

3. The electromagnetic induction braking system as recited in claim 2 wherein said feedback assembly further includes control means coupled to said adjustable DC power supply for controlling said electrical energization of said brake core responsive to said induced electric signal generated by said stator core.

4. The electromagnetic induction braking system as recited in claim 3 wherein said control means of said feedback assembly includes means for gauging and displaying a system parameter.

5. The electromagnetic induction braking system as recited in claim 3 wherein said feedback assembly further includes:

(a) a conditioning circuit coupled to said stator core for commutating and wave-filtering said induced electric signal generated thereby; and, (b) a supplemental power supply coupled to said conditioning circuit for energizing said control means responsive to said induced electric signal.

6. The electromagnetic induction braking system as recited in claim 5 further comprising coupling means for rotatably coupling said fly wheel to said frame, said coupling means including:

(a) a central axle passing through said central opening of said fly wheel and said respective boreholes of said frame support plates;

(b) a plurality of annular bearings coaxially coupled to said central axle; and, (c) at least one bearing collar coaxially coupled to said central axle and secured to one said frame support plate.

7. The electromagnetic induction braking system as recited in claim 6 wherein said predetermined shape of said plates of said brake core is substantially an E-shape.

8. The electromagnetic induction braking system as recited in claim 7 wherein said predetermined material composition of said plates of said brake core includes a silicon steel material.

9. An electromagnetic induction braking system comprising:

(a) a frame including a pair of support plates disposed in spaced manner one from the other, each said support plate having a front edge portion defining an indentation, each said support plate having formed therein a borehole;

(b) a fly wheel having a central opening and a flanged peripheral portion radially offset therefrom, said fly wheel including at least one permanent magnet secured to said peripheral portion;

(c) coupling means for rotatably supporting said fly wheel between said frame support plates, said coupling means including:

(1) a central axle passing through said central opening of said fly wheel and said respective boreholes of said frame support plates;

(2) a plurality of annular bearings coaxially coupled to said central axle; and, (3) at least one bearing collar coaxially coupled to said central axle and secured to one said frame support plate;

(d) a stator core coupled to said frame, said stator core having a plurality of electrically conductive windings, said stator core being electromagnetically coupled to said fly wheel for generation of an induced AC electric signal responsive to the rotation thereof;

(e) a brake core securely received in said indentations of said frame support plates and disposed adjacent said peripheral portion of said fly wheel for electromagnetic coupling therewith, said brake core including a plurality of electrically conductive windings formed about a plurality of substantially E-shaped plates formed of a silicon steel composition; and, (f) a feedback assembly coupled to said stator and brake cores, said feedback assembly including at least one adjustable DC power supply for electrically energizing said brake core responsive to said induced electric signal generated by said stator core, said feedback assembly further including:

(1) means coupled to said adjustable DC power supply for controlling said electrical energization of said brake core responsive to said induced electric signal generated by said stator core, and gauging and displaying a system parameter;

(2) a conditioning circuit coupled to said stator core for commutating and wave-filtering said induced electric signal generated thereby; and, (3) a supplemental DC power supply coupled to said conditioning circuit responsivezing said control means responsive to said induced electric signal;

whereby said brake core is adapted to electromagnetically impart to said fly wheel a braking force for opposing the rotation thereof.

* * * * *